«12» United States Patent
Yoshimatsu

«10» Patent No.: US 6,277,949 B1
«45» Date of Patent: Aug. 21, 2001

«54» COATING COMPOSITIONS

«76» Inventor: Michiharu Yoshimatsu, 6-6-212, Kameido 2-chome, Koto-ku, Tokyo, 136-0071 (JP)

( * ) Notice: Subject to any disclaimer, the term of this patent is extended or adjusted under 35 U.S.C. 154(b) by 0 days.

«21» Appl. No.: 09/494,437

«22» Filed: Jan. 31, 2000

«51» Int. Cl.⁷ .................................................. C08G 69/26
«52» U.S. Cl. .......................... 528/332; 528/170; 528/310; 528/322; 524/59; 524/700; 524/705; 524/904
«58» Field of Search .............................. 524/59, 700, 705, 524/904; 528/170, 310, 322, 332

«56» References Cited

U.S. PATENT DOCUMENTS

| | | | | |
|---|---|---|---|---|
| 4,228,549 | * | 10/1980 | Rispoli ................................ | 264/211 |
| 5,080,743 | * | 1/1992 | Odajima .............................. | 156/243 |
| 5,928,785 | * | 7/1999 | Nishida et al. ..................... | 428/372 |

* cited by examiner

*Primary Examiner*—P. Hampton-Hightower
«74» *Attorney, Agent, or Firm*—Arent Fox Kintner Plotkin & Kahn, PLLC

«57» ABSTRACT

The invention provides a coating composition for building use, which contains a base polyamide resin coating and charcoal powder. The base polyamide resin coating contains a copolymeric nyron and a solvent therefor.

6 Claims, 1 Drawing Sheet

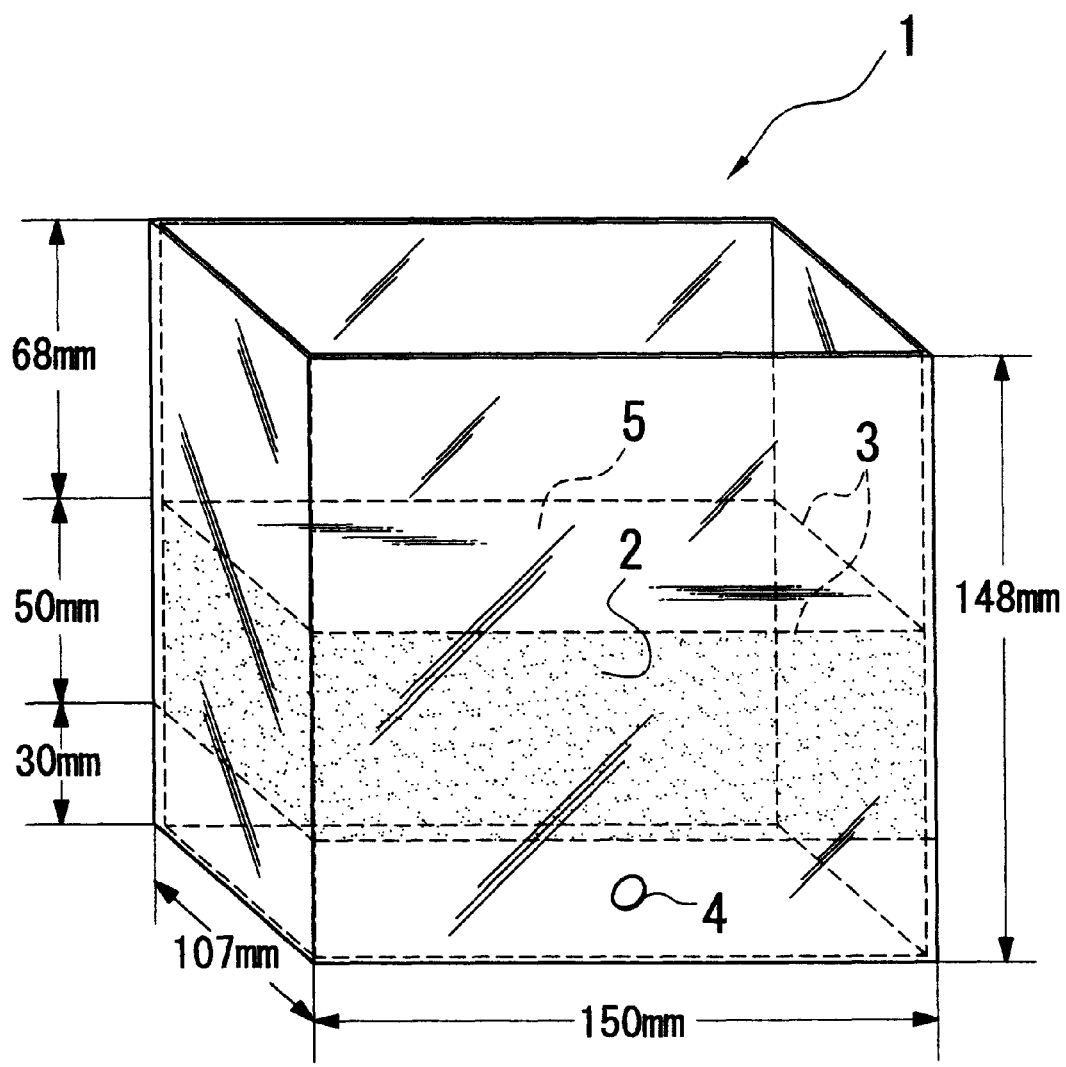

COATING COMPOSITIONS

BACKGROUND OF THE INVENTION

1. Field of the Invention

The present invention relates to a coating composition whose main component is a polyamide resin (hereinafter referred to as "nylon" (trademark) and into which charcoal powder is composed. The composition is used as a material for an architecture, especially as a coating for an interior wall, an underfloor lining, a back lining of a ceiling and a closet.

2. Related Arts

An ordinary house, whether of a reinforced concrete or of wood, tends to be highly moist at a poorly ventilated part, undergoing a dewing and an associated early damage. To avoid this, a desiccant or a heat insulating material is placed or an air conditioning machine is installed.

However, a desiccant serves only to absorb moisture and becomes saturated soon, and thus requires to be replaced frequently. Furthermore, high moisture poses a further effort to combat with molds and hazardous insects.

Now, charcoal absorbs moisture when the atmospheric humidity becomes high, while releases moisture when the humidity becomes low, whereby exerting an ability of keeping the moisture content at about 55% in average, which is called a humidity-controlling effect.

In addition to the utility as a solid fuel, the charcoal shows an effect for keeping off mold, a pesticidal effect for combating with mites and termites and a deodorizing effect for adsorbing unpleasant odors such as ammonia and formaldehyde. Other various excellent properties of the charcoal were also found recently, such as an ability of attenuating electromagnetic waves generated from electrical appliances for domestic use and an air-cleaning effect which allows the negative ion level to be increased while capturing positive ions in the air, thus a wide-range application of the charcoal for the purpose of improving human health and living environment is investigated.

Accordingly, I considered that a building coating having an excellent property of charcoal can be obtained by mixing charcoal powder with a base coating of a synthetic resin and a solvent therefor, and then made an attempt to develop a coating containing charcoal powder.

The charcoal is a black porous material obtained by heating a wood such as evergreen oak or Japanese oak under reflux in the absence of air, and classified broadly into white charcoal with whity surface and black charcoal depending on difference mainly in the manufacturing process. A representative white charcoal is bincho charcoal originated from a raw lumber of holm oak, which is obtained by burning a wood at a temperature as high as 900 to 1400° C. and then pouring a mixture of a suitable amount of water, ash and soil onto the wood taken out from a furnace, whereby effecting a rapid cooling. On the other hand, black charcoal is obtained by burning miscellaneous woods including Japanese oak or other oaks at a temperature of 600 to 800° C., allowing to cool, and then taking them out of the furnace.

Since the charcoal has a microporous structure in its nature, it can readily be pulverized into microparticles having a size of 10 to 30 $\mu$m. In order to prepare a coating containing such charcoal microparticles, various resins, solvents and vehicles are admixed and a test for evaluating the practical utility was performed, and the results obtained were poor in general, because of a poor solubility in a solvent intrinsic to the charcoal. Thus, charcoal powder was attempted to be incorporated into various solvent-based coatings and water-based coatings, but a feasible coating could not be obtained, because of the problems such as difficulty in dispersing uniformly in a mixing step as well as an uneven color in a practical painting step.

SUMMARY OF THE INVENTION

Accordingly, an object of the invention is to provide a coating composition for building use which contains charcoal powder and is capable of exerting the properties of charcoal.

I have further studied and investigated for providing a coating composition for building use, with which the advantageous characteristics of charcoal described above can be utilized, and solved the problems described above and finally established the invention.

Namely, I have discovered that by composing charcoal powder into a base nylon resin coating, it is possible to mix the charcoal powder uniformly with the base coating and to prepare a coating which shows no unevenness in the color of the finished surface. Furthermore, it was also discovered that a nylon resin coating composition containing the charcoal powder at a suitable ratio has the characteristics of a nylon resin together with the characteristics of charcoal.

When a nylon resin film is applied to the interior wall or other region of a building, it allows an excessive water or moisture enclosed in a wall to be released slowly to the outer space, because of its moisture permeability, whereby keeping an appropriate humidity.

In a coating composition according to the invention, a nylon resin for the base nylon resin coating means a copolymeric nylon obtained by using $\epsilon$-caprolactam, hexamethylene diamine, adipic acid and sebacic acid, or a copolymeric nylon obtained by using $\epsilon$-caprolactam, hexamethylene diamine, adipic acid, sebacic acid, $\omega$-laurolactam and $\omega$-aminododecanoic acid, as starting materials.

In a coating composition according to the invention, the charcoal content is 1 to 50% by weight based on the base nylon resin coating. In the charcoal to be composed into the base nylon resin which is prepared by disolving the copolymeric nylon in a solvent, the ratio of white charcoal to black charcoal may be selected as desired. Thus, since white charcoal has excellent air-cleaning effect and electromagnetic wave-attenuating effect, while black charcoal has excellent moisture-controlling effect, anti-bacterial effect and insect-repelling effect, these effects may be taken into consideration to determine the ratio of the white charcoal to the black charcoal.

The solvent for the copolymeric nylon may be ethanol, n-propanol, i-propanol, butanol, i-butanol, benzylalcohol, laurylalcohol, diacetone, cyclohexanol and triethanolamine as well as a mixture thereof.

A reason why a copolymeric nylon resin is selected as a nylon resin in a coating composition of the invention is that a physical characteristic in common with the nylon resins having reduced crystallinities has the solubility in water or alcohols, which serves to increase the affinity with, the enclosure in and the adhesiveness to charcoal.

A main solvent for a resin component described above is preferably an aliphatic monohydric alcohol having 1 to 4 carbon atoms (especially, methanol, ethanol and propanol) and a mixture thereof, while an auxiliary agent for controlling the time period required for drying a coating film is preferably a monohydric alcohol having 1 or 2 ether bonds in its molecule and also having a suitable volatilizability, such as methylcellosolve, ethylcellosolve, propylcellosolve (normal, iso, secondary or tertiary), butylcellosolve, methylcarbitol, ethylcarbitol, diethylene glycol monomethylether as well as a mixture thereof with an aliphatic monohydric alcohol listed above.

In addition to those listed above, a chlorine-based solvent or a phenolic solvent may also be used for a nylon, but the former is difficult to use in view of environmental issues, while the latter is not preferred because of an extremely slow drying and an yellowing of a coated film as a result of a formation of quinone structure in response to the exposure of the residual solvent in the film to ultraviolet ray. Those not suitable as a solvent for preparing a coating composition of this invenstion because of a reduced solubility in a part or all of the resin components are an aromatic solvent such as benzene, toluene, xylene and the like, a ketone-based solvent such as acetone, methylethylketone, methylisobutylketone and the like, an ether-based solvent such as diethylether, diisopropylether and the like, an aliphatic hydrocarbon-based solvent such as n-hexane, n-heptane, i-octane, methylpentane, cyclohexane and the like.

BRIEF DESCRIPTION OF THE DRAWING

The FIGURE shows a device for performing a test on water-proof and gas-permeation performance of a coating formed by using coating compositions according to the invention, which will be referred to later.

DETAILED DESCRIPTION OF PREFERRED EMBODIMENT

The present invention will now be further explained with reference to Test Examples.

TEST EXAMPLE 1 (Evaluation of coatings)

To a base coating whose main component is a nylon resin (of low or high melting point type, containing Nylon 6, 66 or 12) or each of various coatings for general purposes, charcoal powder pulverized into 30 μm (white charcoal:black charcoal=5:5) was added at the ratio of 20% by weight based on the base coating to obtain a test coating. After each coating was evaluated with regard to the dispersibility of the charcoal and the evenness of the color, it was applied twice using a painting brush to an area of 80 mm×100 mm of an asbestos cement slate or a wood plate, and the finished surface was observed.

The results which are shown in Table 1 indicated that the composition of the charcoal into the base coating whose main component is a nylon resin caused no problem such as an uneven color and produced a satisfactory finish, while the composition of the charcoal into the base coating whose main component is an acrylic resin underwent a poor dispersion and produced a finish which could not be acceptable as a coating.

TABLE 1

| Test coating | State of mixture | Appearance of finish |
|---|---|---|
| General purpose coating | | |
| Acrylic emulsion vanish for wood | Δ | X |
| Acrylic emulsion coating (gloss) | X | X |
| Acrylic emulsion coating (non-gloss) | X | X |
| Acrylic enamel | ○ | Δ |

TABLE 1-continued

| Test coating | State of mixture | Appearance of finish |
|---|---|---|
| Urethane resin coating | Δ | Δ |
| Fluorine resin coating | X (Blister formation) | X |
| Silicone resin coating | Δ | X |
| Nylon resin coating | | |
| High boiling point type | ○ | ○ |
| Low boiling point type | ○ | ○ |

Legend for state of mixture
X: Poor (separation)
Δ: Slightly poor
○: Good
Legend for appearance of finish
X: Poor (uneven color)
Δ: Slightly poor
○: Good

TEST EXAMPLE 2 (Charcoal adhesion and wearing resistance test)

A base coating was prepared by adding a copolymeric nylon (20% by weight)] into a solvent [methanol:n-propanol:ethylcellosolve:i-propanol=30:30:10:10 (% by weight) and mixing the same. Then, charcoal powder pulverized into 30 μm (white charcoal:black charcoal=5:5) was added at the ratio of 10% or 30% by volume based on the base coating and mixed to obtain a test coating. Each test coating was applied to a dried wood plate (hinoki; Japanese cypress) and dried, and then subjected to a rubbing test against a wet paper of the size of 20 cm×20 cm and the thickness of 3 mm under a load of 200 g at a speed of two round trips per second. The resin materials tested were as follows.

(a): Nylon mixture (high melting point type, containing Nylon 6, 66, 12 and 610)
(b): Nylon mixture (low melting point type, containing Nylon 6, 66 and 12)
(c): Nylon mixture (high melting point type, containing Nylon 6, 66 and 12)

The evaluation was made in accordance with the criteria shown below.
Charcoal Adhesion (amount of charcoal adhered after 5 round trips)
  X: Substantial adhesion
  Δ: Moderate adhesion
  ○: Slight adhesion
Wearing Resistance
  X: Flaking off before 5 round trips
  Δ: Flaking off before 10 round trips
  ○: No flaking off

TABLE 2

| Nylon resin | Charcoal | Adhesion | Wearing |
|---|---|---|---|
| a | 10% | Δ | ○ |
| b | | ○ | ○ |
| c | | ○ | ○ |
| a | 30% | Δ | X |
| b | | Δ | X |
| c | | Δ | X |

TEST EXAMPLE 3 (Gas permeation and water proof performance test)

A base nylon resin coating (low melting point type) with or without composing the charcoal powder (30 μm, black charcoal only) at the ratio of 20% by weight based on the base coating, or a general purpose urethane resin coating composed the charcoal powder in same amount based on the urethane resin coating was used as test and control coatings and subjected to the gas permeation and water proof performance test described below.

As shown in a FIGURE of the drawing, in a transparent synthetic resin container 1, an ALC (autoclaved light-weight concrete) plate 2 (50 mm in thickness) was arranged at a position at 30 mm from bottom of the container and a gap 3 between side walls of the ALC plate and inner wall of the container was sealed with a silicone sealant. A hole 4 (6 mm in diameter) was formed at a lower part of the front of the container, and 30 g of the test coating was applied evenly over top surface 5 of the ALC plate. After drying of the coating, about a half of the upper space of the container was filled with water and allowed to stand for 48 hours and then observed, whether there was any leakage of the water into the lower space of the container or not. Subsequently, a synthetic resin tube was inserted through the hole 4 at the lower part of the container to pump air therein, for checking whether permeation of the air through the ALC plate 2 causes to allow the air to appear as bubbles through the coating on the surface 5 of the ALC plate or not.

The evaluation was made in accordance with the criteria shown below.

Water Proof Performance
  X: Leakage as far as bottom of container
  Δ: Penetration of water to ALC plate and wet spot formation
  ○: Wet spot formation, but limited to surface of ALC plate Gas Permeation Performance
  X: No air bubbles on ALC plate
  Δ: Slight air bubble formation
  ○: Continuous air bubble formation The results are shown in Table 3, and it was confirmed that the nylon resin coating had water proof and gas permeation performance and it was also proven that the nylon resin coating mixed with charcoal powder also had water proof and gas permeation performance. On the contrary thereto, the urethane resin coating exhibited no gas permeation performance, although it showed the water proof performance in some extent.

TABLE 3

| Test coating | Water proof performance | Gas permeation performance |
| --- | --- | --- |
| Non-charcoal-mixed nylon resin coating | ○ | ○ |
| Charcoal-mixed nylon resin coating | Δ | ○ |
| Urethane resin coating | ○ | X |

TEST EXAMPLE 4 (Formalin adsorption test)

A nylon resin coating (low melting point type) composed charcoal powder (30 μm in particle size, white charcoal: black charcoal=5:5) in amount of 20% by weight based on the amount of the base nylon resin coating was used as a sample coating, which was subjected to the formalin adsorption test described below.

In a synthetic resin container of 4.7 litres in inner volume, small open vessels, each of which accommodates 40 g of a commercially available synthetic rubber-based adhesive containing formalin and 25 g of the sample coating, respectively, were arranged and then the container was closed tightly. Thereafter, a concentration of the formalin in the container was checked at a certain time interval by using a gas detection tube (marketed from Gastec Corporation of Ayase-shi, Kanagawa-ken, Japan, model GV-100S, measuring range:0.1 to 5 ppm). A container receiving only the small vessel which accommodates 40 g of the synthetic rubber-based adhesive containing formalin was used as a control and similarly checked concentration of the formalin.

The results shown in Table 4 indicate that a charcoal-containing nylon resin coating exhibited a remarked formalin-adsorbing ability even immediately after initiating the test, and was proven to be capable of keep the formalin level at 0.1 ppm or lower even after 24 hours.

TABLE 4

|  | Time 0 | Lapsed 12 hours | Lapsed 24 hours |
| --- | --- | --- | --- |
| Control container (without coating) | ≧6 ppm | ≧6 ppm | ≧6 ppm |
| Test container (with coating) | ≧6 ppm | ≦0.1 ppm | ≦0.1 ppm |

A coating composition according to the invention contains a polyamide resin (nylon) as a main component together with charcoal powder, and provides a coating film which possesses both of the properties attributable to a nylon resin such as moisture permeability, transparency and pliability and the properties attributable to the charcoal such as humidity-controlling effect, deodorizing effect, insect-repelling effect, electromagnetic wave-attenuating effect and air-cleaning effect, thus being useful as a coating for building use.

What is claimed is:

1. A coating composition comprising a nylon resin mixture selected from the group consisting of (1) a higher melting point nylon resin mixture which comprises nylon 6, nylon 66, nylon 12 and nylon 610, (2) a lower melting point nylon resin mixture which comprises nylon 6, nylon 66 and nylon 12, and (3) a higher melting point nylon resin mixture which comprises nylon 6, nylon 66 and nylon 12; at least one solvent; and charcoal powder.

2. A coating composition according to claim 1, wherein said charcoal powder is 10–30% by weight based on the weight of the coating composition comprising said nylon resin mixture and said solvent.

3. A coating composition according to claim 1, wherein said solvent comprises at least one member selected from the group consisting of methanol, ethanol, propanol, butanol, benzylalcohol, laurylalcohol, diacetone, cyclohexanol, and triethanolamine.

4. A coating composition according to claim 1, further comprising an auxiliary agent.

5. A coating composition according to claim 4, wherein said auxiliary agent is selected from the group consisting of methylcellosolve, ethylcellosolve, propylcellosolve, butylcellosolve, methylcarbitol, ethylcarbitol and diethylene glycol monomethylether.

6. A coating composition according to claim 1, wherein said charcoal powder is a mixture of pulverized white charcoal and black charcoal.

* * * * *